United States Patent [19]
Berk et al.

[11] Patent Number: 6,017,550
[45] Date of Patent: Jan. 25, 2000

[54] NURITIONAL FORMULA CONTAINING HYDROLYZED PROTEIN AND A FIBER BLEND

[75] Inventors: David F. Berk, Columbus; Merlin D. Breen, Westerville; James N. Chmura, Canal Winchester; Todd A. Huston; William T. Malone, both of Columbus; Karin M. Ostrom, Reynoldsburg, all of Ohio

[73] Assignee: Abbott Laboratories, Abbott Park, Ill.

[21] Appl. No.: 09/059,848

[22] Filed: Apr. 14, 1998

Related U.S. Application Data

[63] Continuation-in-part of application No. 08/816,286, Mar. 13, 1997, abandoned.

[51] Int. Cl.[7] .......................... A01N 65/00; A61K 47/00; A23L 2/00
[52] U.S. Cl. ...................... 424/401; 424/195.1; 424/439; 426/590
[58] Field of Search .......................... 426/590; 424/195.1, 424/439, 401, 951

[56] References Cited

U.S. PATENT DOCUMENTS

| | | |
|---|---|---|
| 4,670,268 | 6/1987 | Mahmoud . |
| 4,765,981 | 8/1988 | Joseph . |
| 5,021,245 | 6/1991 | Borschel et al. . |
| 5,085,883 | 2/1992 | Garleb et al. ............................ 426/590 |
| 5,104,676 | 4/1992 | Mahmoud et al. . |
| 5,104,677 | 4/1992 | Behr et al. . |
| 5,260,279 | 11/1993 | Greenberg . |
| 5,403,826 | 4/1995 | Cope et al. . |
| 5,416,077 | 5/1995 | Hwang et al. . |
| 5,472,952 | 12/1995 | Smidt et al. . |
| 5,492,899 | 2/1996 | Masor et al. . |
| 5,514,655 | 5/1996 | DeWille et al. . |

FOREIGN PATENT DOCUMENTS

| | | |
|---|---|---|
| 0 570 791 A2 | 11/1993 | European Pat. Off. . |
| 93/00019 | 1/1993 | WIPO . |

OTHER PUBLICATIONS

Ross Medical Nutritional System Handbook May 1996.

Primary Examiner—Thurman K. Page
Assistant Examiner—S. Howard
Attorney, Agent, or Firm—Thomas D. Brainard; J. Michael Dixon; Nickki L. Parlet

[57] ABSTRACT

The use of fiber to control infantile colic and diarrhea and adult constipation and diarrhea is well accepted. This invention is specifically directed to liquid nutritional formulas which contain hydrolyzed protein and/or amino acids and dietary fiber. This invention overcomes the problems of product physical stability and high viscosities through the use of soluble/non-fermentable fibers in combination with a blend of insoluble/non-fermentable and soluble/fermentable fibers. The invention is also directed to the use of physiologically effective levels of fibers in nutritional products that use hydrolyzed protein and/or free amino acids for the source of amino nitrogen to treat colic, diarrhea, short gut syndrome and other gastrointestinal maladies.

27 Claims, No Drawings

NURITIONAL FORMULA CONTAINING HYDROLYZED PROTEIN AND A FIBER BLEND

This application is a continuation-in-part of U.S. patent application Ser. No. 08/816,286 filed on Mar. 13, 1997 now abandoned.

The present invention generally relates to liquid nutritional products that contain fiber, and more particularly, to infant formulas with hydrolyzed protein which contain a fiber blend that is useful in the management of infantile colic. The invention also relates to medical nutritional products that contain hydrolyzed protein and/or amino acids, and high levels of total dietary fiber that are useful in the management of diarrhea and other maladies.

BACKGROUND

Fiber is an important component in the treatment of humans with colic, diarrhea, short gut syndrome, impaired bowel function, Chron's disease, gastrointestinal intolerance and malabsorption.

Colic is one of the most confusing subjects facing pediatrics today. In the absence of a standard definition of "colic," it is difficult to compare one study on "colicky infants" with another. Furthermore, given the absence of a standard definition, studies assessing the causes and/or management of colic undoubtedly involve a heterogeneous group of infants with both a variety of problems as well as no problems at all.

Numerous reports in pediatric literature suggest that colic occurs in at least 10% to as high as 30% of both breast-fed and formula-fed infants. Colic is often described as unexpected episodes of crying or fussing which generally occur in the evening hours. While neither an organic or physical cause nor a non-organic etiology has been confirmed, several relatively diverse therapies are nevertheless employed in attempts to treat colic. To those who believe that colic is somehow related to a food allergy to intact protein, certain formulas incorporate hydrolysates, wherein the protein in the formula is broken down to reduce the allergenic response. Another current therapy often employs sedative or anti-spasmodic drugs. Still another therapy used in the treatment of colicky infants involves the use of mechanical rocking or vibrating devices. Unfortunately, each of these treatments is often ineffective.

Fiber is a normal dietary constituent once solid foods become part of the infant's diet, generally at 4 to 6 months of age. Fiber is introduced into the infant's diet only after the infant is consuming foods such as cereals, fruits and vegetables. As such, dietary fiber would not normally be a constituent of the diet of infants who experience colic.

Prior to the present invention, fiber has not been intentionally incorporated into an infant formula with hydrolyzed protein. Typical hydrolyzed protein or hypoallergenic formulas are prone to phase separation upon standing for a short period of time and the addition of dietary fiber only aggravates the stability problem due to the inherent insolubility of numerous fibers. Further, fibers increase viscosities such that incorporation of the dietary fiber at physiologically effective levels produces a liquid of high viscosity that is not suitable for nipple or tube feeding.

The physical stability of the hydrolyzed formula is important as phase separation may result in the recipient receiving an improper balance of nutrients. Phase separation during bottle feeding can also result in rejection of the formula by the infant due to changes in the flavor of the formula. The present invention, in part, relates to a method of incorporating a fiber blend into a formula that contains hydrolyzed protein without resulting in increased phase separation or a product that is too viscous to feed through a nipple or a feeding tube. Formulas produced in accordance with the present invention will be useful in the management of colic, infantile diarrhea and other gastrointestinal conditions where dietary fiber can have a positive impact.

Constipation and diarrhea are problems in a substantial percentage of adult patients receiving enteral feedings. In addition to patient discomfort, diarrhea can severely compromise patient health because of depletion in fluid, electrolytes and other nutrients. The problem is aggravated when the patient requires an elemental or hydrolyzed enteral nutritional formula due to impaired bowel function, surgery or the like. Control of diarrhea in these patients is especially important.

The use of fiber to control or manage diarrhea is well known. Dietary fiber has been included in enteral nutritional formulas such as Ensure® with Fiber, Jevity® and Pedia-Sure® with Fiber. All of these products are marketed by the Ross Products Division of Abbott Laboratories, Columbus, Ohio. A major problem with the inclusion of physiologically effective levels of dietary fiber in hydrolyzed or elemental medical nutritionals is product stability. Hydrolyzed or elemental medical nutritionals are inherently prone to phase separation. Inclusion of dietary fiber only aggravates the product's instability due to the insoluble character of certain fibers. Also, various fibers, at physiologically effective levels, produce products that are of high viscosity and therefore not useful for tube feeding. Thus, there is a need for dietary fiber containing products that possess enhanced shelf life or emulsion stability while avoiding excessive viscosities that would preclude tube feeding and nipple feeding.

U.S. Pat. No. 5,416,077 to Hwang, et al., discloses liquid nutritionals with improved physical stability. The nutritionals having limited sedimentation contain 50 to 1000 parts per million of iota-carrageenan and optionally, kappa carrageenan at a concentration of less than 25% of the total concentration of iota and kappa-carrageenan. This patent does not address the special problems of hydrolyzed formulas wherein the protein component has been hydrolyzed to the degree that it no longer provides stability to the product emulsion.

U.S. Pat. No. 5,492,899 to Masor, et al., discloses an infant formula containing specified levels and ranges of four (4) nucleotides. This patent also suggests that diarrhea can be controlled and the immune system enhanced through consumption of the formula according to the invention. The teachings of U.S. Pat. No. 5,492,899 are incorporated herein by reference.

U.S. Pat. No. 4,670,268 to Mahmoud discloses a hypoallergenic formula that contains carbohydrates, lipids, protein hydrolysates, vitamins and minerals and a starch modified by octenyl succinic anhydride. This patent is concerned with the physical stability of infant formula with hydrolyzed protein but fails to address the additional problem of adding fiber to such a product.

U.S. Pat. No. 5,085,883 to Garleb, et al., teaches a blend of dietary fiber for nutritional products. The blend contains by weight 5 to 50% of a fiber which is both soluble and fermentable; 5 to 20% of a fiber which is both soluble and non-fermentable; and 45 to 80% of a dietary fiber which is both insoluble and non-fermentable. Gum arabic, sodium carboxymethylcellulose and oat hull fiber are disclosed as being useful in the invention. This patent does not address the special needs of hydrolyzed protein containing formulas and does not suggest or disclose a method to calculate the levels of the fiber blend components to produce a nutritional product that possesses acceptable physical stability. The teachings of U.S. Pat. No. 5,085,883 are incorporated herein by reference.

U.S. Pat. No. 5,104,677 to Behr, et al., teaches the combination of a dietary fiber blend with a fat system for a liquid nutritional. The dietary fiber system comprises 5% to 50 dietary fiber which is both soluble and fermentable, 5% to 20% dietary fiber which is both soluble and non-fermentable, and 45% to 80% dietary fiber which is both insoluble and non-fermentable. Less than 10% of the total calories in the product comprise saturated fatty acids, no more than 10% of the total calories in the product comprises polyunsaturated fatty acids, and the ratio of the n-6 to n-3 fatty acids in the product being in the range of 2 to 10. Preferably, the fiber system is gum arabic, sodium carboxymethylcellulose and oat hull fiber.

U.S. Pat. No. 5,021,245 to Borschel, et al., relates to an infant formula for use in the treatment of infantile colic. The formula comprises protein, fat, carbohydrates and 3.1 to 14.1 grams ("gms" or "g") of soy polysaccharide per liter of formula. This patent is closely related to the present invention, however, this reference fails to disclose or suggest a solution to the problem of incorporating a fiber system into a formula containing hydrolyzed protein. The infant formula known as Isomil® DF sold by the Ross Products Division of Abbott Laboratories, Columbus, Ohio is a commercial embodiment of this patent.

U.S. Pat. No. 5,472,952 to Schmidl, et al., relates to nutritionally complete food compositions which contain partially hydrolyzed pectin for the management of diarrhea. This patent teaches that the extent of hydrolysis is critical as extensively hydrolyzed (i.e. peak molecular weight of 3,300 or lower) pectin loses its ability to control diarrhea. This patent does not suggest nor disclose the use of a particular hydrolyzed carboxymethylcellulose in combination with other fibers to produce a hydrolyzed nutritional that possesses enhanced physical stability while being of a sufficiently low viscosity to allow nipple and tube feeding.

U.S. Pat. No. 4,765,981 to Joseph discloses a method for treating infantile colic which comprises orally administering an aqueous extract of oatmeal. It is presumed that boiling oatmeal will result in an aqueous solution of the water soluble oligosaccharides or fibers. This patent fails to disclose or suggest the instant inventive fiber blend for use in hydrolyzed formulas.

U.S. Pat. No 5,260,279 to Greenberg discloses a nutritionally complete composition which contains soluble fiber, especially hydrolyzed guar gum or pectin. This patent does not address the special problems associated with hydrolyzed protein containing nutritionals nor does it suggest the use of an equation to predict product physical stability.

It is thus apparent that the need exists for an improved infant formula with hydrolyzed protein that will significantly decrease the symptoms of colic in a significant number of infants. Also, there is a need for a high residue, hydrolyzed medical nutritional product that contains fiber, has improved emulsion stability, and is of a viscosity that facilitates tube feeding.

SUMMARY OF THE INVENTION

The present invention relates to a nutritional product that contains fiber, particularly infant formulas or medical nutritional products with hydrolyzed protein which contain a fiber blend that is useful in the management of infantile colic, diarrhea and other maladies. The first aspect of the invention provides for a low viscosity liquid nutritional formula with improved physical stability, said formula comprising:

a. a source of amino nitrogen selected from hydrolyzed protein, amino acids and mixtures thereof; and b. a total dietary fiber blend, said fiber blend being of a concentration between 3 and 15 gms per liter of formula, wherein said fiber blend comprises soluble/non-fermentable fiber and at least one fiber selected from insoluble/non-fermentable fibers, soluble/fermentable fibers and mixtures thereof; and wherein the concentration of said total dietary fiber blend in g/l is (T), the percent of total dietary fiber that is soluble can range from 10 to 40 by weight is (S) and the weight percent of soluble fiber that is non-fermentable fiber can range from 20 to 80 is (C); and wherein the resultant to the equation:

$8.473 - 0.39167 \times T - 0.37357 \times S + 0.08099 \times C + 0.01167 \times T \times S + 0.00139 \times C \times S - 0.00119 \times C^2 + 0.00302 \times S^2$ must be equal or less than 3.0.

The low viscosity liquid nutritional formula additionally comprises at least one component selected from the group consisting of fat, carbohydrates, vitamins and minerals. Optionally, all these additional components are included in the nutritional formula. Preferably, the source of amino nitrogen is at a concentration of between 10 and 70 gms per liter of formula; the fat is at a concentration of between 20 and 45 gms per liter of formula; and the carbohydrates, including those from dietary fiber, are at a concentration of between 60 and 190 grams per liter of formula. More preferably the protein concentration is 13 to 20 g per liter; the carbohydrate concentration is 70 to 100 gms/liter; and the blend of dietary fibers is at a concentration of 7 to 12 gms per liter.

The source of amino nitrogen is selected from the group consisting of free amino acids, hydrolyzed soy protein, hydrolyzed caseinates, hydrolyzed whey and mixtures thereof.

The preferred fiber blend includes hydrolyzed carboxymethylcellulose, as the soluble/non-fermentable fiber component, and at least one fiber selected from the group consisting of oat hull fiber, gum arabic, guar gum, citrus pectin, low methoxy pectin, high methoxy pectin, barley glucans, oat glucans, pea hull fiber, soy hull fiber, soy cotyledon fiber, beet fiber and corn bran as the other components of the fiber blend. The most preferred fiber blend is a mixture of hydrolyzed CMC, gum arabic and oat hull fiber. The fat is selected from the group consisting of soy oil, coconut oil, fractions of coconut oil, corn oil, safflower oil, high oleic safflower oil, peanut oil, palm olein oil, olive oil, marine oil, egg yolk oil, sunflower oil, high oleic sunflower oil, canola oil, rapeseed oil, fungal oils and lard and mixtures thereof.

The equation variables comprise T, S and C. T can range from 5 to 10 gms/l and S can range from 20 to 40, preferably T can range from 6 to 10 g/l, S can range from 25 to 35 and C can range from 20 to 40 or 60 to 80, more preferred T is about 10 g/l, S is about 35 and C is about 20. The most preferred formula contains about 2.8 g/l gum arabic, about 6.5 g/l oat fiber and about 0.7 g/l of CMC. The soluble/non-fermentable fiber (C) has a viscosity of 0.2 to 3.5 Pa.s as a 2% wt./wt. aqueous solution.

A second aspect of the invention provides a method of treating humans with a malady selected from the group consisting of colic, diarrhea, short gut syndrome, impaired bowel function, Chron's disease, gastrointestinal intolerance and malabsorption, said method comprises the enteral administration to said human in need of treatment a low viscosity liquid nutritional formula, said formula comprising:

a. a source of amino nitrogen selected from hydrolyzed protein, amino acids and mixtures thereof; and b. a total dietary fiber blend, said fiber blend being of a concentration between 3 and 15 gms per liter of formula, wherein said fiber blend comprises soluble/non-fermentable fiber and at least one fiber selected from insoluble/non-fermentable fibers, soluble/fermentable fibers and mixtures thereof;

and wherein the concentration of total dietary fiber in g/l is (T), the percent of total dietary fiber that is soluble can range from 10 to 40 by weight is (S) and the weight percent of soluble fiber that is non-fermentable fiber can range from 20 to 80 is (C); the resultant to the equation:

$8.473 - 0.39167 \times T - 0.37357 \times S + 0.08099 \times C + 0.01167 \times T \times S + 0.00139 \times C \times S - 0.00119 \times C^2 + 0.00302 \times S^2$ must be equal to or less than 3.0.

Another aspect of the invention provides the method for the production of an enteral formula containing dietary fiber and a source of amino nitrogen and possessing improved physical stability comprising:

a) selecting a total dietary fiber blend (T) consisting of a soluble/non-fermentable component and at least one fiber selected from insoluble/non-fermentable, soluble/fermentable fibers and mixtures thereof; such that the weight percent of total dietary fiber that is soluble fiber(S) is in the range of 10 to 40; and the weight percent of soluble fiber that is non-fermentable (C) is within the range of 20 to 80 and; wherein the values of T, S and C defined above, when placed in the equation:

$8.473 - 0.39167 \times T - 0.37357 \times S + 0.08099 \times C + 0.01167 \times T \times S + 0.00139 \times C \times S - 0.00119 \times C^2 + 0.00302 \times S^2$ provide a resultant number that is 3.0 or less; and b) combining said total dietary fiber blend (T) at a concentration of 3 to 15 g/L with a source of fat, a source of carbohydrate and a source of amino nitrogen selected from the group consisting of hydrolyzed proteins, amino acids and mixtures thereof.

Other aspects of the invention are described throughout the application.

DETAILED DESCRIPTION OF THE INVENTION

The dietary fiber sources utilized in this invention can be characterized by the terms soluble, insoluble, fermentable and non-fermentable. Numerous types of dietary fibers are known and available. Dietary fiber, as used herein and in the claims, is understood to be all of the components of a food that are not broken down by enzymes in the human digestive tract to small molecules which are absorbed into the bloodstream. These food components are mostly celluloses, hemicelluloses, pectin, gums, mucilages, and lignins. Fibers differ significantly in their chemical composition and physical structure and therefore their physiological functions.

The properties of fibers (or fiber systems) that impact on physiological function are solubility and fermentability. With regard to solubility, fiber can be divided into soluble and insoluble types based on the fiber's capacity to be solubilized in a buffer solution at a defined pH. Fiber sources differ in the amount of soluble and insoluble fiber they contain. As used herein and in the claims "soluble" and "insoluble" dietary fiber is determined using American Association of Cereal Chemists (AACC) Method 32-07. As used herein and in the claims, "total dietary fiber" or "dietary fiber" is understood to be the sum of the soluble and insoluble fibers determined by AACC Method 32-07 and wherein by weight, at least 70% of the fiber source comprises dietary fiber. As used herein and in the claims a "soluble" dietary fiber source is a fiber source in which at least 60% of the dietary fiber is soluble dietary fiber as determined by AACC Method 32-07, and an "insoluble" dietary fiber source is a fiber source in which at least 60% of the total dietary fiber is insoluble dietary fiber as determined by AACC Method 32-07.

Representative of soluble dietary fiber sources are gum arabic, sodium carboxymethylcellulose, guar gum, citrus pectin, low and high methoxy pectin, oat and barley glucans, carrageenan and psyllium. Numerous commercial sources of soluble dietary fibers are available. For example, gum arabic, hydrolyzed carboxymethylcellulose, guar gum, pectin and the low and high methoxy pectins are available from TIC Gums, Inc. of Belcamp, Md. The oat and barley glucans are available from Mountain Lake Specialty Ingredients, Inc. of Omaha, Nebr. Psyllium is available from the Meer Corporation of North Bergen, N.J. while the carrageenan is available from FMC Corporation of Philadelphia, Pa.

Representative of the insoluble dietary fibers are oat hull fiber, pea hull fiber, soy hull fiber, soy cotyledon fiber, sugar beet fiber, cellulose and corn bran. Numerous sources for the insoluble dietary fibers are also available. For example, the corn bran is available from Quaker Oats of Chicago, Ill.; oat hull fiber from Canadian Harvest of Cambridge, Minn.; pea hull fiber from Woodstone Foods of Winnipeg, Canada; soy hull fiber and oat hull fiber from The Fibrad Group of LaVale, Md.; soy cotyledon fiber from Protein Technologies International of St. Louis, Mo.; sugar beet fiber from Delta Fiber Foods of Minneapolis, Minn. and cellulose from the James River Corp. of Saddle Brook, N.J.

The second descriptive property of fiber is the capacity to be fermented by the anaerobic bacteria present in the human large bowel. Dietary fibers vary significantly in their fermentability. As used herein and in the claims, the term "non-fermentable" is understood to mean dietary fibers which have a relatively low fermentability of less than 40% by weight, preferably less than 30% by weight, and the term "fermentable" is understood to refer to dietary fibers which have a relatively high fermentability of greater than 60% by weight, preferably greater than 70% by weight.

As used herein and in the claims, fermentability is determined by the procedure described in "Fermentability of Various Fiber Sources by Human Fecal Bacteria In Vitro", at AMERICAN JOURNAL CLINICAL NUTRITION, 1991; 53:141814 1424. This procedure is also described in U.S. Pat. No. 5,085,883 to Garleb, et al., the teachings of both of which are incorporated herein by reference. Representative of fermentable dietary fiber sources are gum arabic and guar gum. Representative of non-fermentable dietary fiber sources are carboxymethylcellulose (CMC), psyllium, oat hull fiber and corn bran.

One aspect of the present invention resides in the discovery of an equation that allows for the production of a hydrolyzed protein nutritional containing from 3 to 15 gms of total dietary fiber per liter having improved physical stability. The equation is used to select levels of soluble fibers and percentages of the soluble fibers that are soluble/non-fermentable fibers. The fiber blends according to the equation provide enhanced physical stability to the nutritional products containing hydrolyzed protein.

The present invention is also based in part, on the discovery that hydrolyzed soluble/non-fermentable fiber is effective in providing physical stability to nutritional formulas that contain additional dietary fibers, hydrolyzed protein and/or free amino acids. While the mechanism of hydrolysis is not believed to be critical, the extent of hydrolysis is important in that extensively hydrolyzed soluble/non-fermentable fibers are not effective in stabilizing the emulsion while those that are not sufficiently hydrolyzed produce a thick and viscous product that cannot be tube or nipple fed. Hydrolysis may be effected by acid conditions, basic conditions or enyzmatic conditions and is monitored by changes in the viscosity of the hydrolysate solution.

Infant formulas should have a viscosity of no higher than about 50 centipoise (cp) or 0.05 Pascal-seconds (Pa.s) to allow for adequate flow through a nipple. It is preferred that the viscosity remain under 0.025 Pa.s and, more preferably, from 0.01–0.025 Pa.s. As used throughout the specification and claims, the term "low viscosity" means a viscosity of less than 0.05 Pa.s as measured by a Brookfield Viscometer using a number 1 spindle at 60 rpm (revolutions per minute), at room temperature. Medical nutritional compositions should have a viscosity of no higher than about 100 centipoise to allow for adequate delivery of nutrients through a tube.

In order to obtain final product viscosity less than 0.05 Pa.s, the viscosity contributed by the fiber component must be controlled. As used herein and in the claims, the term "hydrolyzed soluble/non-fermentable fiber" and "soluble/non-fermentable fiber" means a soluble/non-fermentable fiber having a viscosity of from 0.2 to 3.5 Pa.s (200 to 3,500 cp) when measured as a 2% wt./wt. aqueous solution at room temperature (20° to 25° C.) using a Brookfield Viscometer with the RV#1 spindle at 60 rpm. An exemplary hydrolyzed soluble/non-fermentable fiber is TIC Pretested® Ticalose® CMC 350 which is commercially available from TIC GUMS, Inc., of Belcamp, Md. This product is a sodium carboxy methyl-cellulose derived from cellulose and hydrolyzed by reaction with caustic soda to yield the final viscosity. The level of useful CMC in the nutritional product varies as a function of the other dietary fibers present and the level of total dietary fiber in the nutritional product. The other sources of dietary fiber useful in the present invention include the insoluble/non-fermentable fibers (e.g., oat hull fiber) and the soluble/fermentable fibers (e.g., gum arabic). As used herein, CMC's and psyllium are soluble and non-fermentable fibers.

To achieve a proper balance of physical stability and viscosity in the nutritional product, the level of total dietary fiber is determined by an equation that the inventors have derived from their experimentation. In part, the present invention is based upon the discovery that a person wishing to produce a nutritional product with improved physical stability containing hydrolyzed protein and from 3 to 15 grams of fiber per liter of product can use the following equation to define levels of total dietary fiber (T), soluble fiber (S) and soluble/non-fermentable fiber (C) that will produce an acceptable product. The variables in the equation are:

T=Total Dietary Fiber blend (TDF) in g/L and can range from 3 to 15;

S=Percentage of TDF blend that is soluble and can range from 10 to 40;

C=Percentage of soluble fiber that is non-fermentable and can range from 20 to 80.

All percentage values are used as whole numbers, not the decimal equivalent, in the equation. The resultant of the equation must be 3.0 or less for the product to possess acceptable physical stability and final product viscosity less than 0.05 Pa.s. The predictive equation is:

$$8.473 - 0.39167 \times T - 0.37357 \times S + 0.08099 \times C + 0.01167 \times T \times S + 0.00139 \times C \times S - 0.00119 \times C^2 + 0.00302 \times S^2 \leq 3.0$$

To use the predictive equation, one selects values for T, S and C within the specified ranges and substitutes them into the equation. If the resultant product of the equation is 3.0 or less, then the physical stability of the nutritional product will be acceptable. Details regarding physical stability and the meaning of 3.0 or less are described below.

In the use of the present invention, the following is submitted as illustrative. For example, a dietitian would like to produce a hypothetical nutritional product having nutritionally adequate levels of carbohydrates, fats and hydrolyzed protein. The hypothetical nutritional requires the use of hydrolyzed protein for patients that, for example, are post surgical, have Chron's disease, gastrointestinal intolerance or difficulty in absorbing intact protein. The dietitian would also like the hypothetical nutritional to be tube feedable (low viscosity) and to contain high levels (i.e., at least 10 gms per liter) of dietary fiber to promote gastrointestinal motility. Thus, if the dietitian makes the selection that 30% of the TDF blend should be soluble fiber and the TDF blend should be 10 gm/L, then the question becomes: "Would 50% of the soluble fiber as hydrolyzed CMC produce a stable product?" Placing the values into the equation, one obtains:

$$8.473 - 0.39167 \times (10) - 0.37357 \times (30) + 0.08099 \times (50) + 0.01167 \times (10) \times (30) + 0.00139 \times (50) \times (30) - 0.00119 \times (50) \times (50) + 0.00302 \times (30) \times (30) = 8.473 - 3.9167 - 11.2071 + 4.0495 + 3.501 + 2.085 - 2.975 + 2.718 = 2.7277$$

and therefore, the proposed hypothetical product will possess acceptable physical stability and viscosity.

Due to the complexity of the above equation (which represents the relationship between the factors and the desired physical stability), it is generally not possible to claim ranges for T, S and C such that any combination of T, S and C within given ranges will give a product stability score of 3.0 or below. It is true that for practically any value of one of the factors, e.g., C, there are values of the remaining two factors, i.e., T and S, that will yield a product stability score of 3.0 or less. It should be noted that the value of T, S and C as used in the equation, are without units, thus for example, 5 gms/liter is used as 5 and 20% of soluble fiber that is CMC is used as 20 (All percentage values are used as whole numbers, not the decimal equivalent).

As used herein and in the claims, the term hydrolyzed protein means any dietary source of amino nitrogen known in the art, such as hydrolyzed proteins from animal and vegetable sources, amino acids, and mixtures thereof. The degree of hydrolysis can vary, however, an aspect of the present invention is that the protein molecules have been degraded to the point that the protein has substantially lost its ability to function as a stabilizer or emulsifier in the nutritional composition. Thus, through the process of the present invention, an elemental (only amino acids) or protein hydrolysate formula can be produced which has improved emulsion (physical) stability.

Preferably the nutritional product has as its protein source, hydrolyzed soy protein, hydrolyzed whey protein, hydrolyzed milk proteins or blends thereof. The nutritional products containing high levels of dietary fiber produced in accordance with this invention typically contain hydrolyzed protein at a concentration of between 10 and 70 grams per liter. Protein concentration for infant formula is preferably 10 and 25 grams per liter, most preferred 13 and 20 grams per liter of formula. While adult protein levels would be higher, for example 40 to 70 grams per liter. In either case, fat is at a concentration of between 10 and 45 grams per liter of formula, and carbohydrates including total dietary fiber are a concentration of between 60 and 190 grams per liter of formula. Infant formula fat is more preferably between 24 and 38 grams per liter; the carbohydrates are more preferably between about 70 and about 90 grams per liter of formula, and said total dietary fiber blend is between 3 and 10 grams per liter of formula. Medical nutritional fat is more preferably between 10 and 20 grams per liter; the carbohydrates are more preferably between about 150 and about 185 grams per liter of formula and said total dietary fiber blend is between 5 and 15 grams per liter of formula.

The fat or lipid useful in the formula according to the invention may be any known consumable animal, vegetable or microorganism derived lipid. More specifically, the fat is selected from the group consisting of soy oil, coconut oil, fractions of coconut oil, corn oil, high oleic safflower oil, peanut oil, palm olein oil, olive oil, marine oil, egg yolk oil, high oleic sunflower oil, canola oil, rapeseed oil, fungal oils and lard and mixtures thereof.

In a more preferred embodiment of the invention, said protein has as its source, hydrolyzed casein, said fat has as its source a blend of soy and coconut oils and said carbohydrates, except for those from dietary fiber, have as their source sucrose or corn syrup or a blend thereof.

In one embodiment of the invention, the formula comprises a nitrogen source which consists of casein hydrolysate and free amino acids, said nitrogen source is of a concentration of about 19 grams per liter of formula; fat at a concentration of about 37 grams per liter of formula and has as its source a blend of soy, safflower and coconut oils; carbohydrates including total dietary fiber are of a concentration of about 75 grams per liter of formula and have as their source, other than that from dietary fiber, sucrose and tapioca starch.

A commercial benefit of the invention is in the relative ease and cost-effective means for manufacturing a hydrolyzed nutritional that contains high levels of dietary fiber that possesses acceptable physical stability and viscosity. Other aspects and advantages of the instant invention will be apparent from the following description, examples, and the appended claims.

Specifically, the present invention is concerned with a hydrolyzed or elemental nutritional which has been formulated to alleviate the symptoms of colic and diarrhea. The present invention is also concerned with a method for making a fiber containing hydrolyzed formula that has improved physical stability and acceptable viscosities.

The enteral formula of this invention is different from the prior art in that it uses hydrolyzed proteins and/or amino acids and a blend of fibers at specified levels that enhances the physical stability of the liquid nutritional without imparting unacceptable viscosities.

The additive fiber source for the formulas of this invention are a blend of fibers that are determined by the aforementioned equation which provides a level of soluble/non-fermentable fiber that is used in conjunction with a given blend of insoluble/non-fermentable and soluble/fermentable fibers. The equation is used to design a liquid product that is of an acceptable viscosity (i.e., thin enough to be nipple fed or tube fed) and yet has improved physical stability.

One insoluble/non-fermentable fiber useful in this invention is Fibrim 300®, a commercially available soy fiber from Protein Technologies International which has the composition set out in Table I.

TABLE I

Approximate Composition of FIBRIM 300 ®

| Nutrient | FIBRIM 300 ® per 100 g |
|---|---|
| Protein | 11.6 g |
| Fat | 1.0 g |
| Carbohydrate | 71.0 g |
| Ash | 6.5 g |
| Moisture | 6.5 g |
| Calcium | 440. mg |
| Phosphorous | 330. mg |
| Magnesium | 220. mg |
| Sodium | 250. mg |
| Potassium | 870. mg |
| Chloride | 170. mg |
| Iron | 12.0 mg |
| Zinc | 2.2 mg |
| Copper | 0.26 mg |
| Thiamin | 0.09 mg |
| Riboflavin | 0.22 mg |
| Pyridoxine | 0.008 mg |
| Niacin | 0.093 mg |
| Folic Acid | 5.47 mcg |
| Pantothenic Acid | 0.017 mg |
| Biotin | 0.054 mg |
| Choline | 85. mg |
| Inositol | 121. mg |
| Dietary Fiber | 78.2 g |

Representative of the soluble/non-fermentable dietary fibers useful in the present invention are the hydrolyzed carboxymethylcelluloses (CMC). A preferred CMC is TIC Pretested® Ticalose® CMC 350 which is commercially available from TIC Gums, Inc. of Belcamp, Md. CMC 350 is sodium carboxymethylcellulose derived from cellulose. It is odorless and tasteless with no caloric value. CMC is water soluble and produces formulations of low viscosity when compared to other CMC's. A 2% solution by wt. of CMC 350 in water produces a viscosity of 2.20 to 3.10 Pa.s as determined by a Brookfield Viscometer using a RV #1 spindle. The pH of this solution at room temperature is 6.0–8.5. Also useful in this invention is TIC Pretested® Ticalose® CMC 15F Powder which is a more hydrolyzed version of CMC 350 which produces a viscosity of less than 0.3 Pa.s when measured as described above. One aspect of the present invention relates to the discovery that the fiber blend must use a hydrolyzed CMC that produces a relatively low viscosity in the final product.

It also should be noted that in the following Tables II and III total dietary fiber is included in the listing of "carbohydrate" content. Further, the terms "dietary fiber", "fiber" and "total dietary fiber" for purposes of this invention should be construed as being synonymous unless otherwise defined.

In actual use, the formula of this invention is consumed by an individual that can benefit from increased levels of dietary fiber such as a colicky infant or long term tube feeder. Representative formulas for the infant and adult nutritionals are set forth in Table II.

TABLE II

Representative Formulas

| Nutrient | Concentration per liter of formula | |
|---|---|---|
| | Infant | Adult |
| Caloric Density Cal/ml | 0.6–1.0 | 1.0–1.3 |
| Protein, g (hydrolyzed) | 13.0–20.0 | 40.0–70.0 |
| Fat, g | 24.0–38 | 10.0–20.0 |
| Carbohydrate, g | 70.0–90.0 | 150–185 |
| Calcium, mg | 510–910 | 650–1270 |
| Phosphorus, mg | 390–600 | 650–1270 |
| Magnesium, mg | 50–100 | 260–425 |
| Sodium, mg | 190–360 | 500–1000 |
| Potassium, mg | 730–1100 | 1200–1570 |
| Chloride, mg | 420–575 | 1020–1320 |
| Iron, mg | 8–16 | 12–19 |
| Zinc, mg | 5–8 | 15–20 |
| Copper, mcg | 500–1000 | 1400–2110 |
| Iodine, mcg | 100–510 | 100–150 |
| Manganese, mcg | 34–500 | 3400–5280 |
| Vitamin A, IU | 2000–3800 | 3330–8670 |
| Vitamin D, IU | 400–500 | 270–425 |
| Vitamin E, IU | 20–26 | 30–40 |
| Vitamin K, mcg | 55–200 | 54–90 |
| Vitamin C, mg | 60–200 | 200–300 |
| Thiamin, mcg | 405–4100 | 1600–2000 |
| Riboflavin, mcg | 610–2000 | 1900–2300 |
| Pyridoxine, mcg | 400–800 | 2600–2700 |
| Vitamin B-12, mcg | 1–6 | 7–8 |
| Niacin, mg | 7–15 | 20–27 |
| Folic Acid, mcg | 100–275 | 260–530 |
| Pantothenic Acid, mg | 3–7.5 | 10–14 |
| Biotin, mcg | 30–150 | 310–410 |
| Taurine, mg | 45–70 | 130–200 |
| Carnitine, mg | 35–60 | 100–130 |
| Choline, mg | 50–202 | 400–530 |
| Inositol, mg | 30–100 | NAP |
| Total Dietary Fiber, g | 3–10 | 5–15 |
| Chromium, mcg | NAP | 70–110 |
| Selenium, mcg | NAP | 50–80 |
| Moybdenum, mcg | NAP | 100–160 |

The nutritional formula of this invention is generally prepared using the method set out in Example I. A more detailed process for the production of a medical nutritional containing dietary fiber is described in U.S. Pat. No. 5,104,677 to Behr et al., the teachings of which are herein incorporated by reference. A more detailed process for the production of an infant nutritional formula containing dietary fiber is described in U.S. Pat. No. 5,021,245 to Borschel, et al., the teachings of which are herein incorporated by reference. In this specific example, the infant formula contains appropriate nutrients in compliance with the Infant Formula Act as of the date of this application. It should also be recognized that the unique formula of this invention could be prepared for use in powdered form or as a concentrated liquid. The invention will be better understood in view of the following examples, which are illustrative only and should not be construed as defining the invention.

EXAMPLES

Example I

The base formula was a commercially available infant formula having the following composition.

TABLE III

Base Formula

| Nutrient | per 100 calories |
|---|---|
| Protein (equivalent) | 2.75 g |
| Fat | 5.54 g |
| Carbohydrate | 10.2 g |
| Calcium | 105 mg |
| Phosphorous | 75 mg |
| Magnesium | 7.5 mg |
| Sodium | 44 mg |
| Potassium | 118 mg |
| Chloride | 80 mg |
| Iron | 1.8 mg |
| Zinc | 0.75 mg |
| Copper | 75 mcg |
| Iodine | 15 mcg |
| Manganese | 30 mcg |
| Vitamin A | 300 IU |
| Vitamin D | 45 IU |
| Vitamin E | 3 IU |
| Vitamin K | 15 mcg |
| Vitamin C | 9 mg |
| Thiamin | 60 mcg |
| Riboflavin | 90 mcg |
| Vitamin B-6 | 60 mcg |
| Vitamin B-12 | 0.45 mcg |
| Niacin | 1350 mcg |
| Folic Acid | 15 mcg |
| Pantothenic Acid | 750 mcg |
| Biotin | 4.5 mcg |
| Choline | 8 mg |
| Inositol | 5 mg |
| Total Dietary Fiber | 0.75–2.25 g |
| Carrageenan | 100 mg. |

The control sample containing carrageenan was prepared without the fiber blend to provide a point of comparison for the physical stability evaluation discussed below.

Three experimental formulas samples were prepared using 5, 10 and 15 gm of Total Dietary Fiber (TDF) per liter of formula. The fiber blend was a mixture of CMC (TIC Pretested® Ticalose® CMC 15F), gum arabic and oat hull fiber. The experimental samples were prepared as set forth below.

1 kg. of vegetable oil was blended and heated to 37–49° C. (100–120° F.). A preblend of oil soluble vitamins (Vitamin A, Vitamin D, Vitamin E and Vitamin K) and the appropriate amount (to result in the amount set out in Table IV for each sample) of gum arabic was added to the oil blend and agitated until uniform. The gum arabic was supplied by TIC Gums, Inc. of Belcamp, Md.

17.3 kgs. (38 lbs.) of water was added to an appropriate container and heated to 60–66° C. (140°–150° F.). Mineral salts (10 g. of calcium hydroxide, 25 g. of dicalcium phosphate, 40 g. of calcium citrate), 5 g. amino acids (L-tryptophan and L-tyrosine), 600 g. of casein hydrolysate, and carbohydrates (600 g. of starch and 1250 g. of sucrose) were then added to the water and agitated until uniform. Appropriate amounts of oat hull fiber and CMC were added to result in the levels set forth in Table IV. The oil blend was then added to comprise the processing blend. The oat hull fiber was supplied by Opta Food Ingredients, Inc. of Bedford, Me.

The pH of the blend was adjusted to 6.65–6.85 before processing. The product was pumped through an emulsifying pump, heated to 140–155° C. (285–310° F.), cooled to 74–85° C. (165–185° F.), homogenized and cooled to 1–8° C. (34–45° F.).

After a 48 hour hold at 1–8° C. (34–45° F.), the batches were completed by adding a solution containing 14 g. of magnesium chloride, 12 g. of sodium chloride, 3 g. of potassium chloride, 13 g. of dipotassium phosphate, 10 g. of potassium citrate, 0.1 g. of potassium iodide, 2 g. of ferrous sulfate, 9 g. of L-cystine, 0.5 g. of L-carnitine, 3.5 g. of choline chloride, ascorbic acid, and a preblend of water soluble vitamins. Additional water was added to dilute the batch to 676 kcal/l. The product was filled into 0.23 kg. (8 ounce) glass bottles, closed and sterilized in an agitating retort cooker.

Table IV sets forth the level of each fiber in gms per liter of formula for each sample produced.

TABLE IV

Fiber Blend

| Sample No. | Gum Arabic gms/L | Oat fiber gms/L | CMC 15F gms/L | Total gms/L |
|---|---|---|---|---|
| 1 | 0.4 | 4.5 | 0.1 | 5 |
| 2 | 0.62 | 3.75 | 0.62 | 5 |
| 3 | 1.6 | 3 | 0.4 | 5 |
| 4 | 0.4 | 3 | 1.6 | 5 |
| 5 | 0.1 | 4.5 | 0.4 | 5 |
| 6 | 0.5 | 9 | 0.5 | 10 |
| 7 | 2 | 6 | 2 | 10 |
| 8 | 2 | 7.5 | 0.5 | 10 |
| 9 | 0.5 | 7.5 | 2 | 10 |
| 10 | 1.25 | 7.5 | 1.25 | 10 |
| 11 | 1.2 | 13.5 | 0.3 | 15 |
| 12 | 0.3 | 13.5 | 1.2 | 15 |
| 13 | 4.8 | 9 | 1.2 | 15 |
| 14 | 1.2 | 9 | 4.8 | 15 |
| 15 | 1.88 | 11.25 | 1.88 | 15 |

The control and experimental samples after sterilization were then subjected to storage conditions that attempted to simulate what a commercial product would experience on its way from the factory to the point of consumption. Further, the test parameters simulate the opening of a shaken can of the fiber containing infant formula and its storage in a refrigerator for 48 hours. Thus, the samples were initially stored for a period of two months at room temperature. The samples were then shaken very vigorously for at least 15 seconds (both up and down and in a horizontal motion) to assure that all sediment was dispersed and suspended. After shaking, the samples were refrigerated for 24 hours.

The samples were then removed from refrigeration, without shaking or agitation and placed on a laboratory bench top in order of degree of physical stability. The samples were evaluated on a scale of how closely they resembled the control (carrageenan, no fiber) with 1 being the most physically stable and 10 being a complete failure. The following sets forth a description of the physical appearance for each number rating.

| Rating No. | Description |
|---|---|
| 1 | Sample completely homogeneous |
| 2 | A very slight sediment formation or separation near the bottom |
| 3 | Obvious sedimentation, but color is almost identical to control |
| 4 | A cloudy narrow band has formed (usually closer to the bottom) |
| 5 | A mostly clear narrow band has formed (usually closer to the bottom) |
| 6 | A darker/tan region starts to form in the middle of the bottle |
| 7 | Obvious color and density change has occurred in the center |
| 8 | A very definite whey layer has formed, it is fairly clear to cloudy |

-continued

| Rating No. | Description |
|---|---|
| 9 | The whey layer is nearly translucent |
| 10 | All cream has risen and a nearly transparent whey layer has formed |

After evaluation, the samples were returned to refrigeration, as gently as possible, for another 24 hours. The samples were removed from refrigeration and placed on the bench top and evaluated again. The samples remained on the bench at room temperature for the next thirty (30) days. At the end of this 30 day period, sediment/whey/cream measurements were recorded for each sample by holding a metric ruler beside each bottle and recording the height of each separate layer. After the measurements were taken, the samples were shaken and placed in refrigeration. The samples were evaluated at 24 hours, refrigerated, evaluated again at 48 hours and left on the bench top for 30 days as before. Sediment/whey/cream measurements were taken, the samples were then shaken and returned to refrigeration. After 24 hours, the samples were evaluated, returned to refrigeration, evaluated after another 24 hours and then left on the bench top. Ten (10) days later, sediment/whey/cream measurements were again taken and the samples remained on the bench top until they reached the date of 6 months from manufacture.

At 6 months, post manufacture, the sediment/whey/cream measurements were taken, the samples shaken, as before, and placed in refrigeration. After 48 hours under refrigeration, the samples were placed on the bench top in order of acceptability and the results were recorded.

Table V sets forth data collected for the "6 month–48 hour shake evaluation." The Table sets forth samples #s, % by weight of TDF as soluble fiber (CMC plus gum arabic), % by weight of soluble fiber that is CMC and physical stability scores for each sample.

TABLE V

Result of the "6 Month - 48 Hour Shake Evaluation"

| Sample # | % by wt. of TDF-soluble fiber | % by wt. of soluble that is CMC | Physical Stability Ratings | | |
|---|---|---|---|---|---|
| | | | 5 g/L TDF | 10 g/L | 15 g/L |
| 0 | 10 | 20 | 6 | — | — |
| 2 | 10 | 80 | 3 | — | — |
| 3 | 40 | 20 | 1 | — | — |
| 4 | 40 | 80 | 2.5 | — | — |
| 5 | 25 | 50 | 3 | — | — |
| 6 | 10 | 50 | — | 4 | — |
| 7 | 40 | 50 | — | 2.5 | — |
| 8 | 25 | 20 | — | 1.5 | — |
| 9 | 25 | 80 | — | 1.5 | — |
| 10 | 25 | 50 | — | 3 | — |
| 11 | 10 | 20 | — | — | 1.5 |
| 12 | 10 | 80 | — | — | 1.5 |
| 13 | 40 | 20 | — | — | 2 |
| 14 | 40 | 80 | — | — | 2.5 |
| 15 | 25 | 50 | — | — | 3 |

A physical stability rating of 3.0 or less was determined to be an acceptable rating. A fiber containing product with a rating of 3.0 or less did not exhibit phase separation to the point that consumption by an infant would present a nutritional imbalance concern.

From this experimental design, the equation was derived which allows for the production of a formula that contains dietary fiber at high levels which possess acceptable physical stability and viscosities.

Example II

The procedure set forth in Example I was used except that TIC Pretested® Ticalose® CMC 350 Powder was used in place of the CMC 15F. CMC 350 is sodium carboxymethylcellulose derived from cellulose and has a maximum viscosity of 3.1 Pa.s as a 2% wt./wt. aqueous solution measured with a Brookfield Viscometer using an RV#1 spindle. Various formulations, as in Example I were made and tested. The only acceptable products, based on the criteria set out in Example I, were as follows:

TDF 5 g/l, 40% soluble and 20% of soluble as CMC
TDF 10 g/l, 25% soluble and 20% of soluble as CMC
TDF 10 g/l, 25% soluble and 50% of soluble as CMC
TDF 15 g/l, 10% soluble and 20% of soluble as CMC
TDF 15 g/l, 10% soluble and 80% of soluble as CMC
TDF 15 g/l, 40% soluble and 80% of soluble as CMC This Example demonstrates that the higher viscosity CMC's are also useful in the present invention, however, there are numerous products which are outside the solution space of the equation.

Example III

This control experiment used the procedure set forth in Example I except that an unhydrolyzed CMC known as TIC Pretested® Ticalose® from TIC Gums, Inc. was used in place of the CMC 15. CMC 2500 is a carboxymethylcellulose that has a viscosity of 1000–2000 Pa.s as a 2% wt/wt aqueous solution measured with a Brookfield Viscometer using an RV #1 spindle at 60 rpm. This example failed as the product gelled and was therefore impossible to process. This example demonstrates that CMC with a viscosity of greater than 3.5 Pa.s, when measured as a 2% wt. to wt. aqueous solution with a Brookfield Viscometer using a RV#1, is outside the scope of the invention.

CONCLUSION

The improved fiber containing hydrolyzed nutritional formula according to this invention possesses improved physical stability compared to formulas that do not utilize the fiber blends of this invention. This invention also provides a physically stable formula with hydrolyzed protein that is useful in the treatment of infantile colic, diarrhea, short gut syndrome and other pediatric maladies. The problems encountered by the medical and infant nutrition industry in preparing products that contain dietary fiber and which exhibit good shelf life (product stability) and acceptable viscosities are unique. Due to the high levels of minerals, vitamins and fiber found in these products, the nutritional industry, until now, has failed to provide a solution to this long felt need. Through the use of the invention described herein, the industry can prepare and supply hydrolyzed nutritional products containing physiologically effective levels of total dietary fiber that exhibit improved physical stability without unacceptable viscosities. The medical community has a continuing need for new products that will assist in the management of colic in infants and diarrhea in tube fed patients.

While the process, product and methods of this invention have been described in detail, it is to be understood that the invention is not limited to the precise examples given and that changes and variations may be made therein without departing from the scope of the invention which is defined in the following claims.

What is claimed is:

1. A low viscosity liquid nutritional formula with improved physical stability, said formula comprising:
   (a) a source of amino nitrogen selected from hydrolyzed protein, amino acids and mixtures thereof; and
   (b) a total dietary fiber blend, said fiber blend being of a concentration between 3 and 15 gms per liter of formula, wherein said fiber blend comprises soluble/non-fermentable fiber and at least one fiber selected from insoluble/non-fermentable fibers, soluble/fermental fibers and mixtures thereof; and wherein the concentration of said total dietary fiber blend in g/l is (T), the percent of total dietary fiber that is soluble can range from 10 to 40 by weight is (S) and the weight percent of soluble fiber that is said soluble/non-fermentable fiber can range from 20 to 80 is (C); and wherein the resultant to the equation:

$$8.473 - 0.39167 \times T - 0.37357 \times S + 0.08099 \times C + 0.01167 \times T \times S + 0.00139 \times C \times S - 0.00119 \times C^2 + 0.00302 \times S^2$$ must be equal to or less than 3.0.

2. The low viscosity liquid nutritional formula according to claim 1 which additionally comprises at least one component selected from the group consisting of fat, carbohydrates, vitamins, and minerals.

3. The low viscosity liquid nutritional formula according to claim 2 wherein said source of amino nitrogen being of a concentration of between 10 and 70 gms per liter of formula; said fat being of a concentration of between 20 and 45 gms per liter of formula; and said carbohydrates, including those from dietary fiber, being of a concentration of between 60 and 190 grams per liter of formula.

4. The low viscosity liquid nutritional formula according to claim 1 wherein said source of amino nitrogen is selected from the group consisting of free amino acids, hydrolyzed soy protein, hydrolyzed caseinates, hydrolyzed whey and mixtures thereof.

5. The low viscosity liquid nutritional formula according to claim 1 wherein said fiber blend is a mixture of hydrolyzed carboxymethylcellulose and at least one fiber selected from the group consisting of oat hull fiber, gum arabic, guar gum, citrus pectin, low methoxy pectin, high methoxy pectin, barley glucans, oat glucans, pea hull fiber, soy hull fiber, soy cotyledon fiber, beet fiber and corn bran.

6. The low viscosity liquid nutritional formula according to claim 1 wherein T can range from 5 to 10 gms/l and S can range from 20 to 40.

7. The low viscosity liquid nutritional formula according to claim 6 wherein T can range from 6 to 10 g/l, S can range from 25 to 35 and C can range from 20 to 40 or 60 to 80.

8. The low viscosity liquid nutritional formula according to claim 7 wherein T is about 10 g/l, S is about 35 and C is about 20.

9. The low viscosity liquid nutritional formula according to claim 8 wherein the fiber blend is a mixture of hydrolyzed CMC, gum arabic and oat fiber.

10. The low viscosity liquid nutritional formula according to claim 9 wherein said formula contains about 2.8 g/l gum arabic, about 6.5 g/l oat fiber and about 0.7 g/l of CMC.

11. The low viscosity liquid nutritional formula according to claim 5 wherein said fiber blend is a mixture of hydrolyzed carboxymethylcellulose, oat hull fiber and gum arabic.

12. The low viscosity liquid nutritional according to claim 2 wherein the fat is selected from the group consisting of soy oil, coconut oil, fractions of coconut oil, corn oil, safflower oil, high oleic safflower oil, peanut oil, palm olein oil, olive oil, marine oil, egg yolk oil, sunflower oil, high oleic sunflower oil, canola oil, rapeseed oil, fungal oils and lard and mixtures thereof.

13. The low viscosity liquid nutritional according to claim 2 wherein said source of amino nitrogen is at a concentration of 13 to 20 g per liter; said carbohydrate is at a concentration of 70 to 100 gms/liter; said blend of dietary fibers is at a concentration of 7 to 12 gms per liter; said blend of dietary fibers is a mixture of hydrolyzed carboxymethylcellulose, oat hull fiber and gum arabic wherein the weight percent of soluble fiber can range from 25 to 35% of total dietary fiber and the weight percent of soluble fiber that is hydrolyzed carboxymethylcellulose can range from 20 to 40 or 60 to 80.

14. A method of treating humans with a malady selected from the group consisting of colic, diarrhea, short gut syndrome, impaired bowel function, Chron's disease, gastrointestinal intolerance and malabsorption, said method comprises the enteral administration to said human in need of treatment a low viscosity liquid nutritional formula, said formula comprising:

(a) a source of amino nitrogen selected from hydrolyzed protein, amino acids and mixtures thereof; and (b) a total dietary fiber blend, said fiber blend being of a concentration between 3 and 15 gms per liter of formula, wherein said fiber blend comprises soluble/non-fermentable fiber and at least one fiber selected from insoluble/non-fermentable fibers, soluble/fermental fibers and mixtures thereof; and wherein the concentration of total dietary fiber in g/l is (T), the percent of total dietary fiber that is soluble can range from 10 to 40 by weight is (S) and the weight percent of soluble fiber that is said soluble/non-fermentable fiber can range from 20 to 80 is (C); the resultant to the equation:

$$8.473-0.39167 \times T-0.37357 \times S+0.08099 \times C+0.01167 \times T \times S+0.00139 \times C \times S-0.00119 \times C^2+0.00302 \times S^2 \text{ must be equal to or less than } 3.0.$$

15. The method of treating humans according to claim 14 wherein the formula additionally comprises fat, carbohydrates, vitamins, and minerals.

16. The method of treating humans according to claim 15 wherein said source of amino nitrogen being of a concentration of between 10 and 70 gms per liter of formula; said fat being of a concentration of between 20 and 45 gms per liter of formula; and said carbohydrates, including those from dietary fiber being of a concentration of between 60 and 190 grams per liter of formula.

17. The method of treating humans according to claim 14 wherein said source of amino nitrogen is selected from the group consisting of free amino acids, hydrolyzed soy protein, hydrolyzed caseinates, hydrolyzed whey and mixtures thereof.

18. The method of treating humans according to claim 14 wherein said fiber blend is a mixture of hydrolyzed carboxymethylcellulose and at least one fiber selected from the group of oat hull fiber, gum arabic, guar gum, citrus pectin, low methoxy pectin, high methoxy pectin, barley glucans, oat glucans, pea hull fiber, soy hull fiber, soy cotyledon fiber, beet fiber and corn bran.

19. The method of treating humans according to claim 18 wherein said fiber blend is a mixture of hydrolyzed carboxymethylcellulose, oat hull fiber and gum arabic.

20. The method of treating humans according to claim 15 wherein the fat is selected from the group consisting of soy oil, coconut oil, fractions of coconut oil, corn oil, high oleic safflower oil, peanut oil, palm olein oil, olive oil, marine oil, egg yolk oil, high oleic sunflower oil, canola oil, rapeseed oil, fungal oils and lard and mixtures thereof.

21. A method for the production of an enteral formula containing dietary fiber and a source of amino nitrogen and possessing improved physical stability; said method comprises:

(a) selecting a total dietary fiber blend (T) consisting of a soluble/non-fermentable component and at least one fiber selected from insoluble/non-fermentable, soluble/fermentable fibers and mixtures thereof, such that the weight percent of total dietary fiber that is soluble fiber (S) is in the range of 10 to 40 and the weight percent of soluble fiber (S) that is soluble/non-fermentable (C) is within the range of 20 to 80 and wherein the values of T, S and C defined above, when placed in the equation:

$$8.473-0.39167 \times T-0.37357 \times S+0.08099 \times C+0.01167 \times T \times S+0.00139 \times C \times S-0.00119 \times C^2+0.00302 \times S^2 \text{ provide a resultant number that is 3.0 or less; and}$$

(b) combining said total dietary fiber blend (T) at a concentration of 3 to 15 g/L with a source of fat, a source of carbohydrate and a source of amino nitrogen selected from the group consisting of hydrolyzed proteins, amino acids and mixtures thereof.

22. The method according to claim 21 wherein the TDF blend is a mixture of hydrolyzed carboxymethylcellulose and at least one fiber selected from the group of oat hull fiber, gum arabic, guar gum, citrus pectin, low methoxy pectin, high methoxy pectin, barley glucans, oat glucans, pea hull fiber, soy hull fiber, soy cotyledon fiber, beet fiber and corn bran.

23. The method according to claim 22 wherein the TDF blend is a mixture of hydrolyzed carboxymethylcellulose, oat hull fiber and gum arabic.

24. A powder nutritional formulated such that upon reconstitution with a specified amount of liquid, it produces a liquid nutritional formula according to claim 1.

25. The low viscosity liquid nutritional according to claim 1 wherein said nutritional is an infant formula.

26. The method according to claim 14 wherein said liquid nutritional formula is an infant formula.

27. The a low viscosity liquid nutritional formula according to claim 1 wherein said soluble/non-fermentable fiber has a viscosity of 0.2 to 3.5 Pa.s as a 2% wt./wt. aqueous solution.

* * * * *